US008807368B1

(12) United States Patent
Riedel

(10) Patent No.: US 8,807,368 B1
(45) Date of Patent: Aug. 19, 2014

(54) SERVING VESSEL SET

(71) Applicant: Target Brands, Inc., Minneapolis, MN (US)

(72) Inventor: Richard P. Riedel, Blaine, MN (US)

(73) Assignee: Target Brands, Inc., Minneapolis, MN (US)

( * ) Notice: Subject to any disclaimer, the term of this patent is extended or adjusted under 35 U.S.C. 154(b) by 38 days.

(21) Appl. No.: 13/778,631

(22) Filed: Feb. 27, 2013

(51) Int. Cl.
*B65D 21/02* (2006.01)
*B29D 22/00* (2006.01)
*A47G 23/06* (2006.01)

(52) U.S. Cl.
CPC .............. *A47G 23/06* (2013.01); *B29D 22/003* (2013.01)
USPC .......................... 220/23.89; 220/574; 206/514

(58) Field of Classification Search
USPC ......... 206/514, 499, 502, 503, 505, 507, 564, 206/501, 509; 220/574, 575, 23.88, 23.89, 220/427, 23.83, 23.86, 23.87, 4.26
See application file for complete search history.

(56) References Cited

U.S. PATENT DOCUMENTS

| 2,213,837 | A | * | 9/1940 | Gill ............................... 220/575 |
| 2,575,770 | A | * | 11/1951 | Roop ............................. 206/514 |
| 2,878,932 | A | | 3/1959 | Martire, Jr. |
| 3,219,226 | A | | 11/1965 | Schroeder |
| 4,461,396 | A | | 7/1984 | Harper |
| 4,607,758 | A | | 8/1986 | Stevens |
| 4,744,597 | A | | 5/1988 | Bauman et al. |
| 4,951,832 | A | * | 8/1990 | Tenney et al. ............... 220/23.83 |
| 4,966,297 | A | | 10/1990 | Doty |
| 4,989,742 | A | | 2/1991 | Powell |
| 5,125,363 | A | | 6/1992 | McGaha |
| 5,419,455 | A | | 5/1995 | Russeau |
| 5,429,231 | A | | 7/1995 | McSpadden |
| 5,429,266 | A | | 7/1995 | D'Oliveira et al. |
| D368,627 | S | | 4/1996 | McSpadden |
| D384,556 | S | | 10/1997 | Logan et al. |

(Continued)

OTHER PUBLICATIONS

"9.5 inch Foil Flan Dish", printed from www.alibaba.com/product-gs/249397074/9_5_Foil_flan_dish.html on Oct. 9, 2011 (3 pages).

(Continued)

*Primary Examiner* — Fenn Mathew
*Assistant Examiner* — Robert Stodola
(74) *Attorney, Agent, or Firm* — Griffiths & Seaton PLLC; JoAnn M. Seaton

(57) ABSTRACT

A series of vessels includes first, second, and third vessels. The first vessel includes a first bottom wall and a first coupling feature formed on a bottom surface of the first bottom wall. The second vessel includes a second bottom wall, a second coupling feature, and a third coupling feature. The second coupling feature is formed on a top surface of the second bottom wall and is configured to engage with the first coupling feature to form a first mated pair. The third coupling feature is formed on a bottom surface of the second bottom wall. The third vessel is sized larger than the second vessel and includes a third bottom wall, a fourth coupling feature, and a fifth coupling feature. The fourth coupling feature is formed on a top surface of the third bottom wall and is configured to engage with the third coupling feature of the second vessel to form a second mated pair. The fifth coupling feature is formed on the top surface of the third bottom wall and is configured to selectively engage with the first coupling feature of the first vessel to form a third mated pair.

24 Claims, 12 Drawing Sheets

(56) References Cited

U.S. PATENT DOCUMENTS

| | | | |
|---|---|---|---|
| D390,752 S * | 2/1998 | DeCoster | D7/505 |
| 6,311,841 B1 | 11/2001 | Hodges | |
| 6,315,126 B1 | 11/2001 | Cornelissen | |
| 6,729,472 B2 | 5/2004 | Stucke et al. | |
| D504,799 S | 5/2005 | Lawson et al. | |
| D560,099 S | 1/2008 | Hatcher | |
| D587,970 S | 3/2009 | Zack et al. | |
| 7,506,763 B2 | 3/2009 | Hatcher | |
| D611,306 S | 3/2010 | Zack et al. | |
| 7,722,907 B2 * | 5/2010 | Roberts et al. | 426/107 |
| D652,259 S | 1/2012 | Hatcher et al. | |
| 2003/0155267 A1 * | 8/2003 | Mercier et al. | 206/515 |
| 2007/0205190 A1 | 9/2007 | Yang | |
| 2008/0206437 A1 | 8/2008 | Perry | |

OTHER PUBLICATIONS

"Artesia Chip and Dip", printed from http://www.crateandbarrel.com/dining-and-entertaining/chip-and-dips/1 on Oct. 10, 2011 (1 page).

"Stoneware Pottery Chip and Dip Sets", printed from www.outofthefirestudio.com/chip_and_dip.html on Oct. 10, 2011 (2 pages).

"2-Piece Chip and Dip Set", printed from www.crateandbarrel.com/2-piece-chip-and-dip-set/s613642 on Feb. 27, 2013 (2 pages).

Office Action from corresponding Canadian Patent Application No. 2,807,745, mailed Jun. 11, 2013 (2 pages).

* cited by examiner

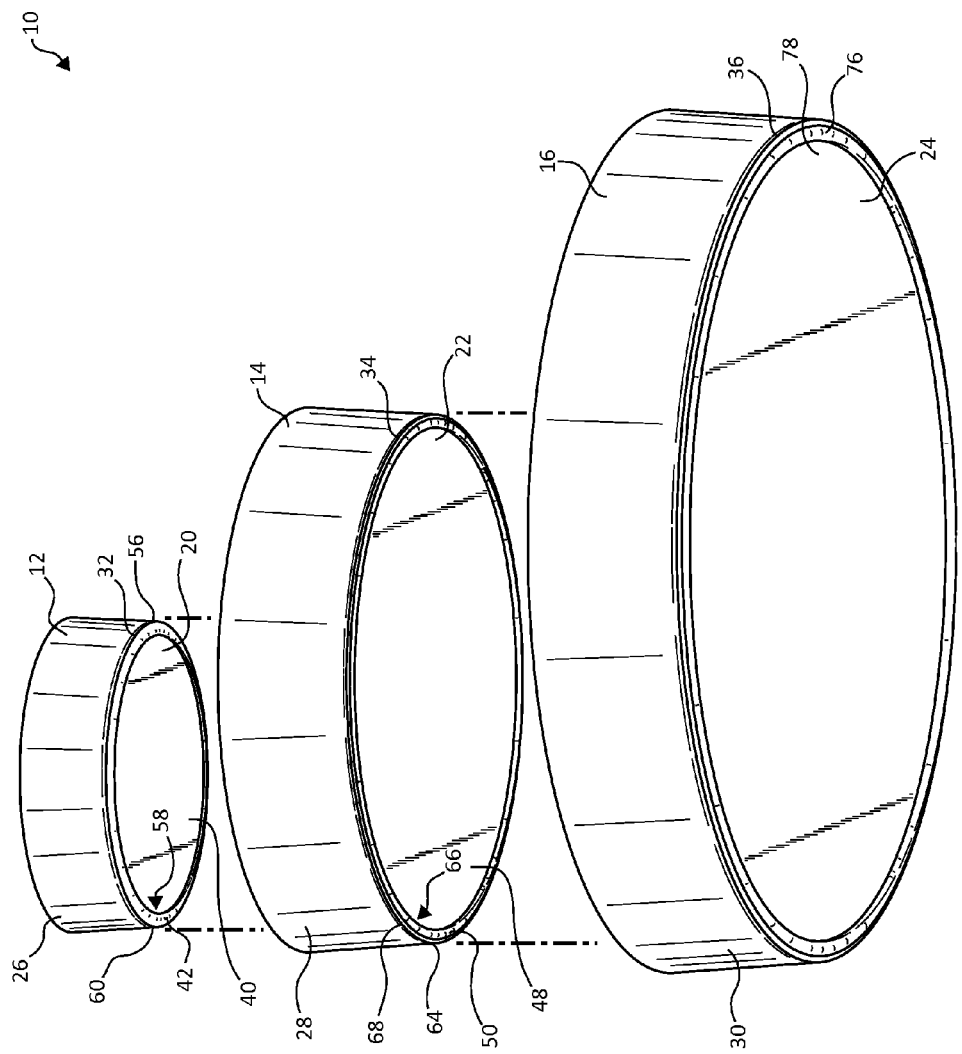

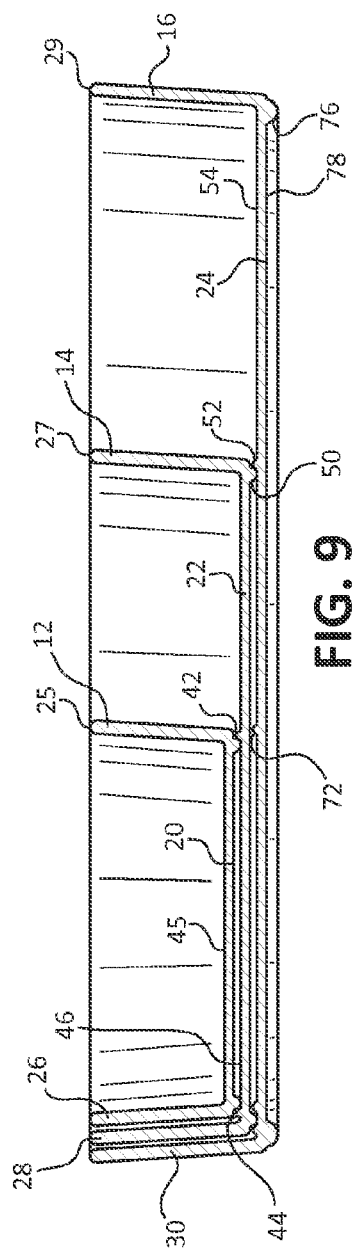
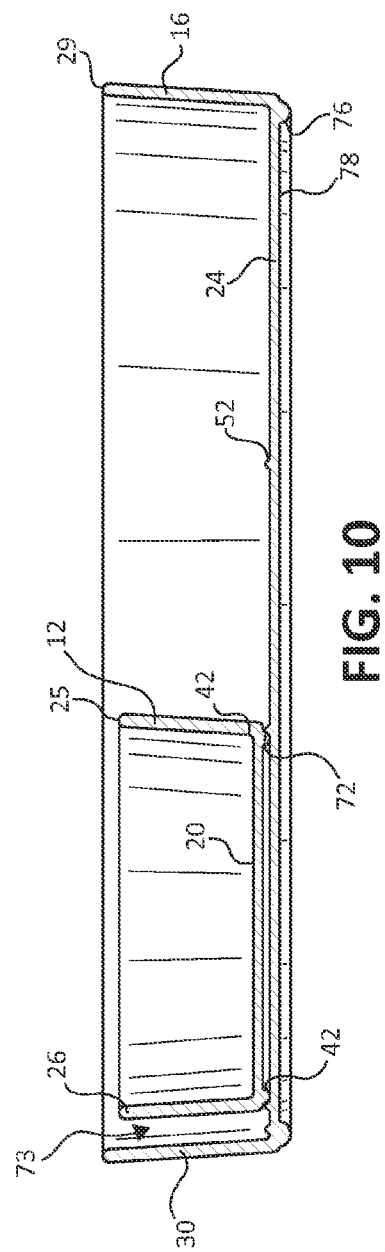

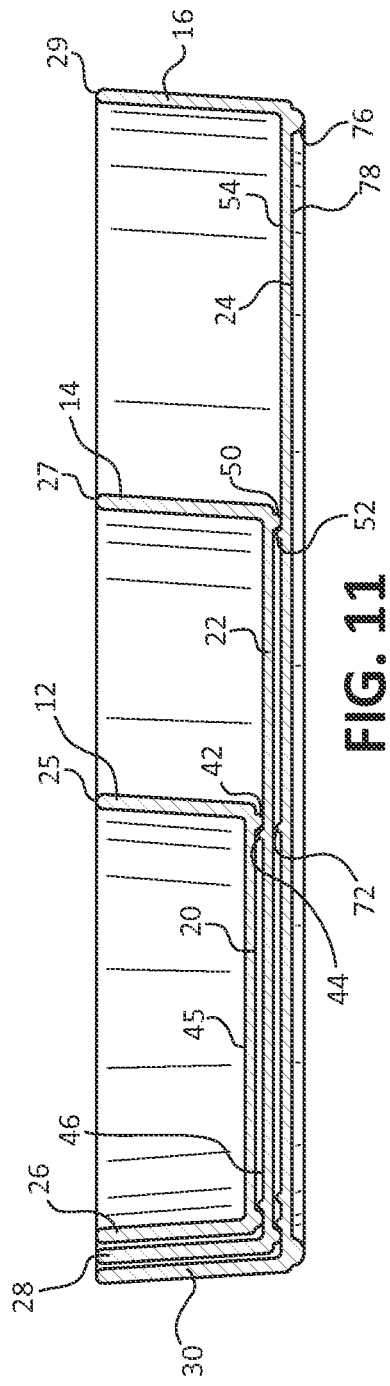
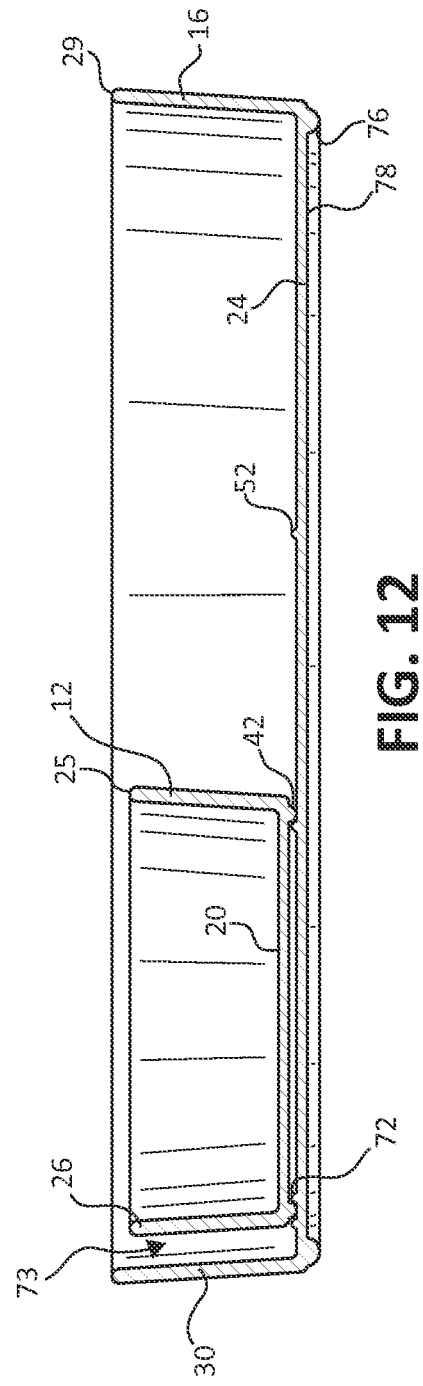

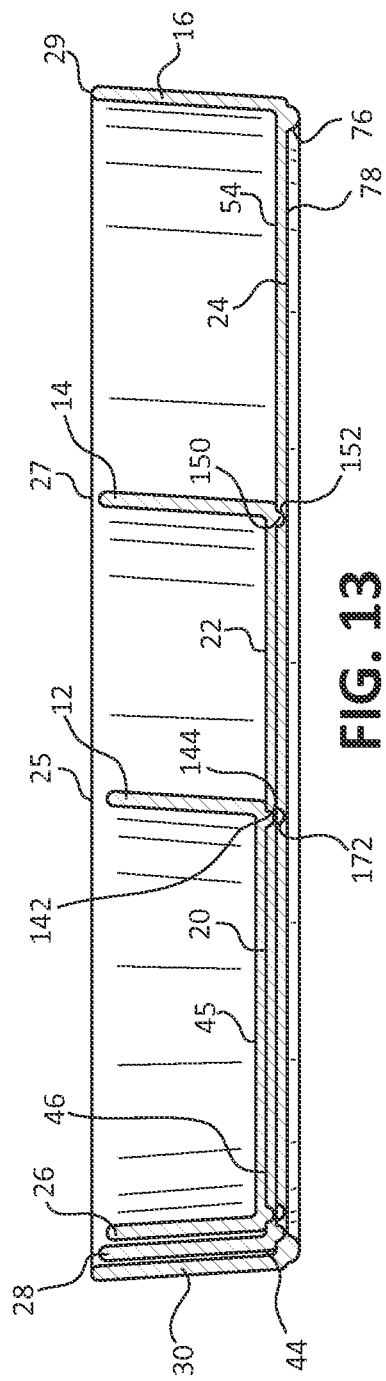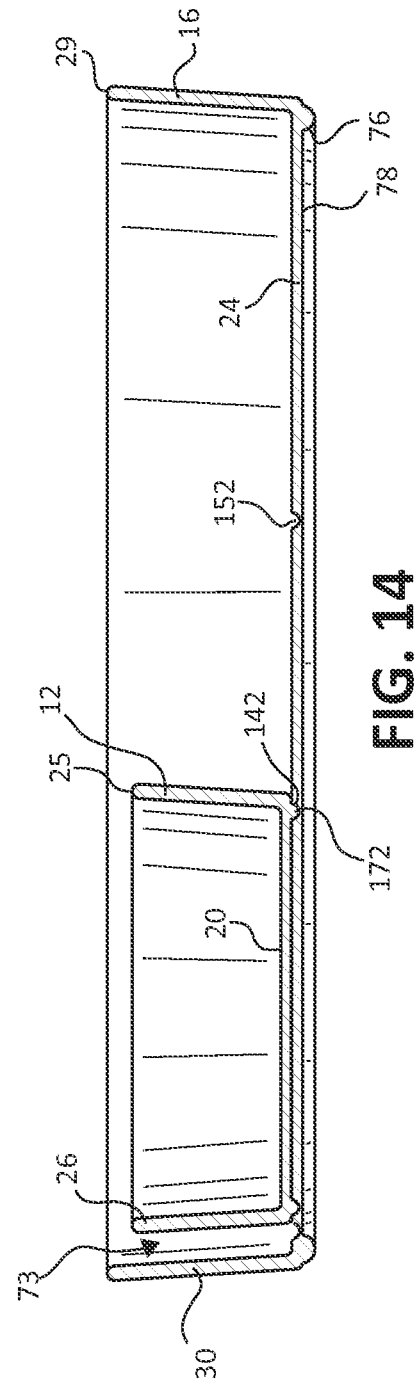

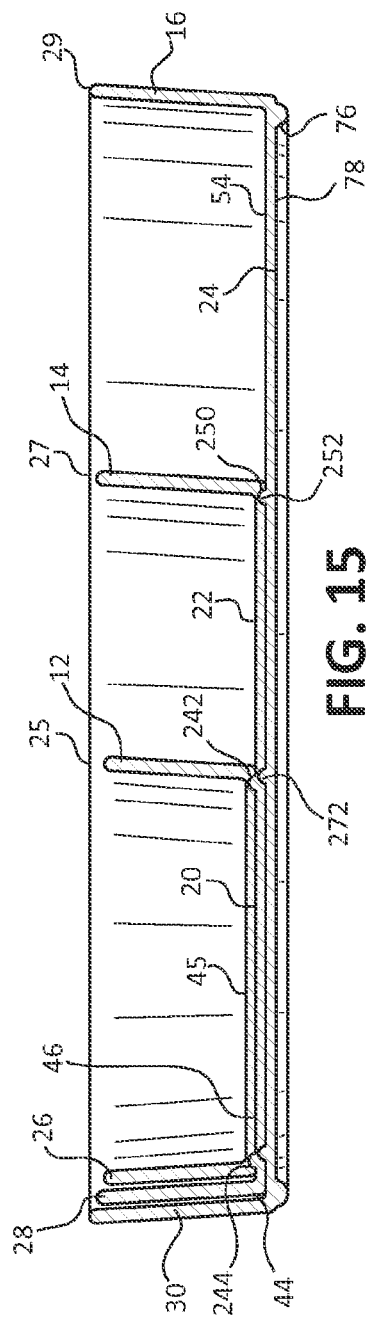
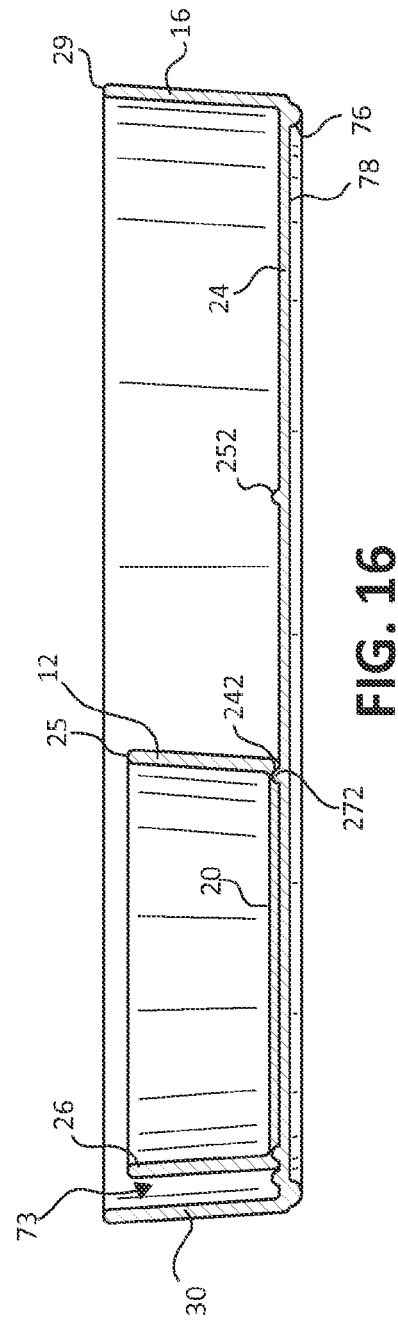

SERVING VESSEL SET

BACKGROUND OF THE INVENTION

Food servingware is available in a variety of shapes and sizes. For example, flat trays are used to present large items, such as hams, roasts, or other cuts of meats, for sharing, or to serve small bite-sized items, such as various types of crudités or hors d'oeuvres. Baking dishes are used to serve hot foods, such as casseroles, or other food items accompanied by a sauce or other liquid. Trays can be employed for serving salads, pastas, soups or other types of items.

Some foods may be paired and served together. To optimize the food experience, each food of the paired foods may be placed in separate containers or dishes during service. For example, vegetables, crackers, or chips, which preferably remain dry before dipping, are placed on a tray, tray or other vessel, while an accompanying dip or sauce is often served in a separate dish or tray.

SUMMARY OF THE INVENTION

One aspect of the present invention relates to a series of vessels including a first vessel, a second vessel, and a third vessel. The first vessel includes a first bottom wall and a first coupling feature formed on a bottom surface of the first bottom wall. The second vessel is sized larger than the first vessel and includes a second bottom wall, a second coupling feature, and a third coupling feature. The second coupling feature is formed on a top surface of the second bottom wall and is configured to engage with the first coupling feature of the first vessel to form a first mated pair selectively mating the first vessel with the second vessel. The third coupling feature is formed on a bottom surface of the second bottom wall. The third vessel is sized larger than the second vessel and includes a third bottom wall, a fourth coupling feature, and a fifth coupling feature. The fourth coupling feature is formed on a top surface of the third bottom wall and is configured to engage with the third coupling feature of the second vessel to form a second mated pair selectively mating the second vessel with the third vessel. The fifth coupling feature is formed on the top surface of the third bottom wall and is configured to selectively engage with the first coupling feature of the first vessel to form a third mated pair selectively mating the first vessel with the third vessel. The series of vessels only forms one of the second mated pair and the third mated pair at any one time. Other series, sets, and associated methods are also shown and described.

BRIEF DESCRIPTION OF THE DRAWINGS

Embodiments of the invention will be described with respect to the figures, in which like reference numerals denote like elements, and in which:

FIG. 8 is a bottom, perspective view of the series of trays of FIG. 2 in an exploded configuration, according to one embodiment of the present invention.

FIG. 9 is a cross sectional view illustration of the series of trays of FIG. 4, according to one embodiment of the present invention.

FIG. 10 is the cross sectional view illustration of the series of trays of FIG. 9, with a medium tray of the series of trays being removed, according to one embodiment of the present invention.

FIG. 11 is a cross sectional view illustration of another series of trays, according one embodiment of the present invention.

FIG. 12 is the cross sectional view illustration of the series of trays of FIG. 11, with a medium tray of the series of trays being removed, according one embodiment of the present invention.

FIG. 13 is a cross sectional view illustration of another series of trays, according one embodiment of the present invention.

FIG. 14 is the cross sectional view illustration of the series of trays of FIG. 13, with a medium tray of the series of trays being removed, according one embodiment of the present invention.

FIG. 15 is a cross sectional view illustration of another series of trays, according one embodiment of the present invention.

FIG. 16 is the cross sectional view illustration of the series of trays of FIG. 15, with a medium tray of the series of trays being removed, according one embodiment of the present invention.

DETAILED DESCRIPTION

A series of trays or vessels is provided that is aesthetically pleasing and can be used for serving several different types of foods together while each food remains separated from the others. The series of trays includes three or more components that are configured to nest and fit together in a variety of configurations, which provides an end user with a number of options for presenting the same series of trays. The number of options further allows the end user, using only the series of trays, to select different options as desired dependent upon the particular foods stored in each of the trays and the end user's desired presentation of those foods.

In particular, according to an embodiment, the series includes at least a small tray, a medium tray, and a large tray. The small tray includes a circular flange extending downwardly from its bottom surface configured to correspond with a rim protruding upwardly from an interior surface of the medium tray. The medium tray also includes a flange extending downwardly from its bottom surface. The flange of the medium tray corresponds with a rim protruding upwardly from an interior surface of the large tray. Thus, when the small tray is placed within the medium tray, such that the flange of the small tray and the rim of the medium tray are aligned with each other, the small tray is maintained in a predefined lateral and longitudinal location relative to the medium tray forming a first two-tray serving series. Similarly, when the medium tray is placed inside the large tray and the flange of the medium tray and the rim of the large tray are aligned with each other, the medium tray is maintained in a lateral and longitudinal predefined location relative to the large tray forming a second two-tray serving series. In another embodiment, the small tray is fit into the medium tray, and the medium tray is fit into the large tray using the rims and flanges of each to form a three-tray serving series configuration. When used as either the two or three tray serving series configuration, the trays provide different spaces for foods thereby maintaining the foods separately from each other during service while still providing the foods in a cohesive grouping maintained within the confines of the large tray.

Figure 1:
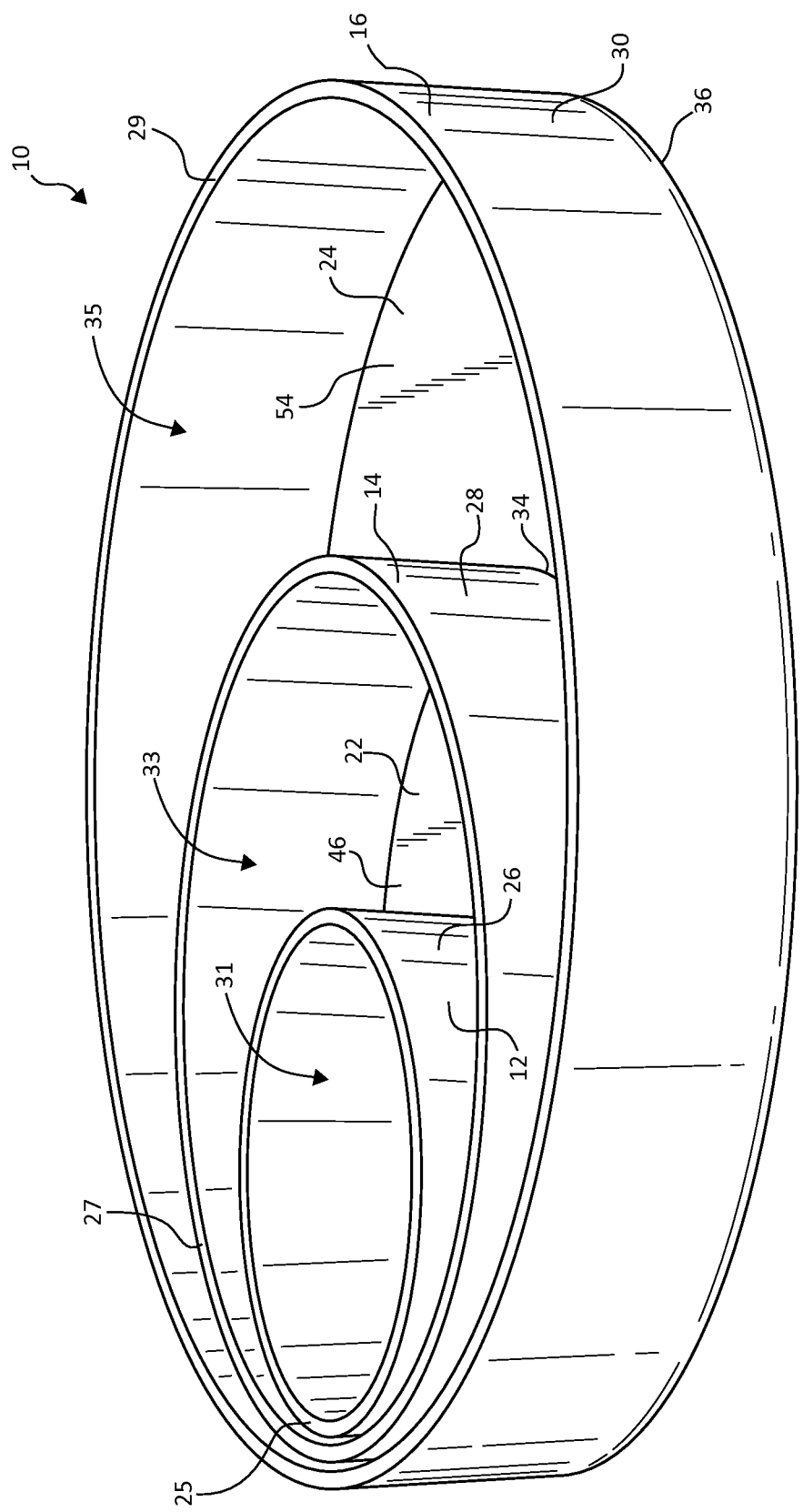
FIG. 1 is a front, top perspective view illustration of a series of trays in a stacked configuration, according to one embodiment of the present invention.
Figure 2:
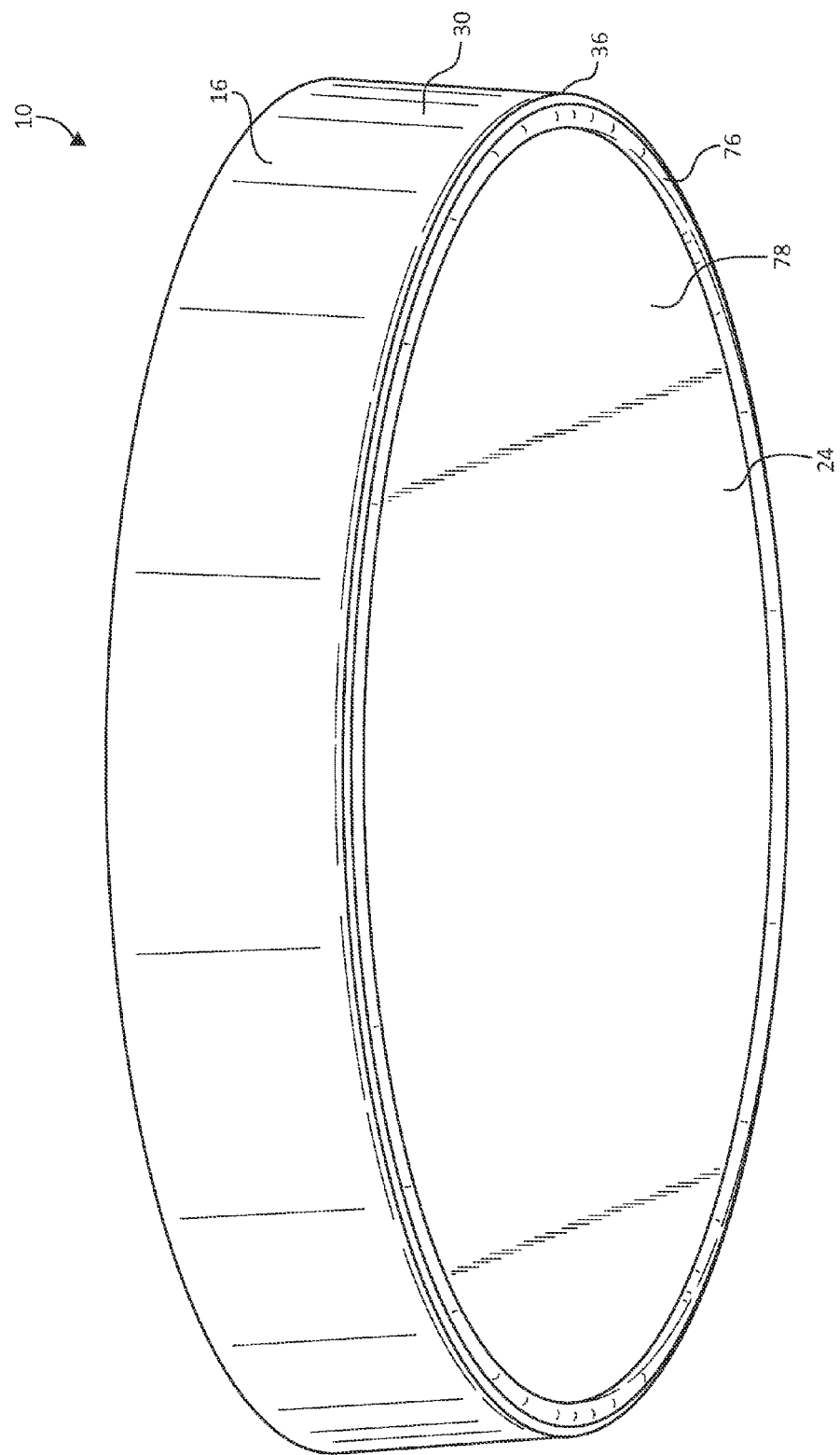
FIG. 2 is a bottom, perspective view illustration of the series of trays of FIG. 1, according to one embodiment of the present invention.
Figure 3:
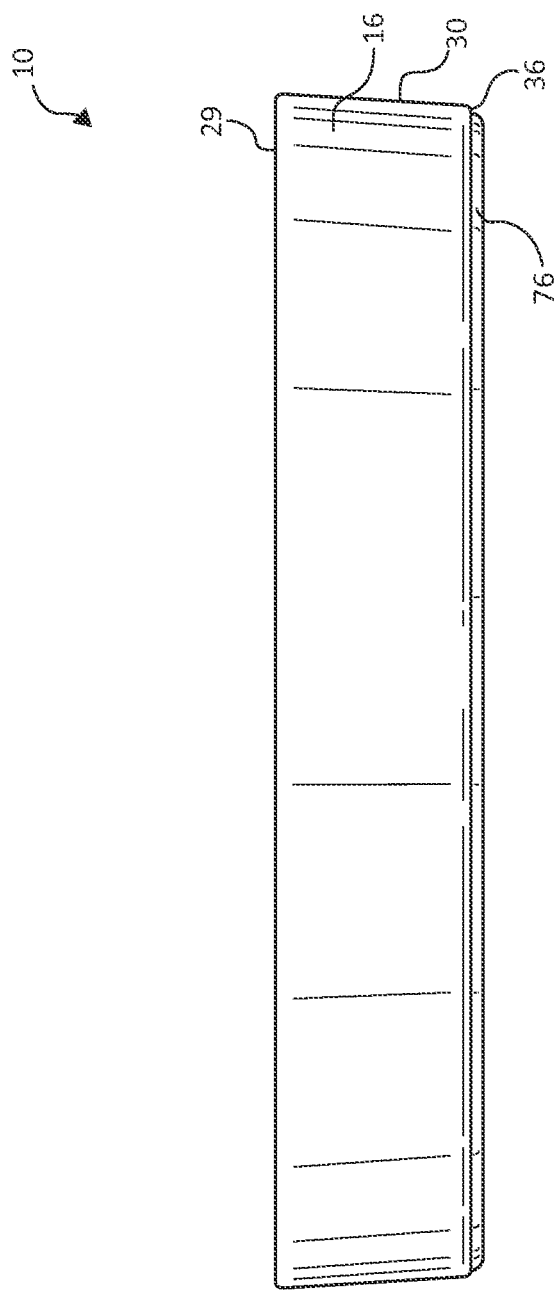
FIG. 3 is a front view illustration of the series of trays of FIG. 1 with the rear view being a mirror image of the front view, according to one embodiment of the present invention.
Figure 4:
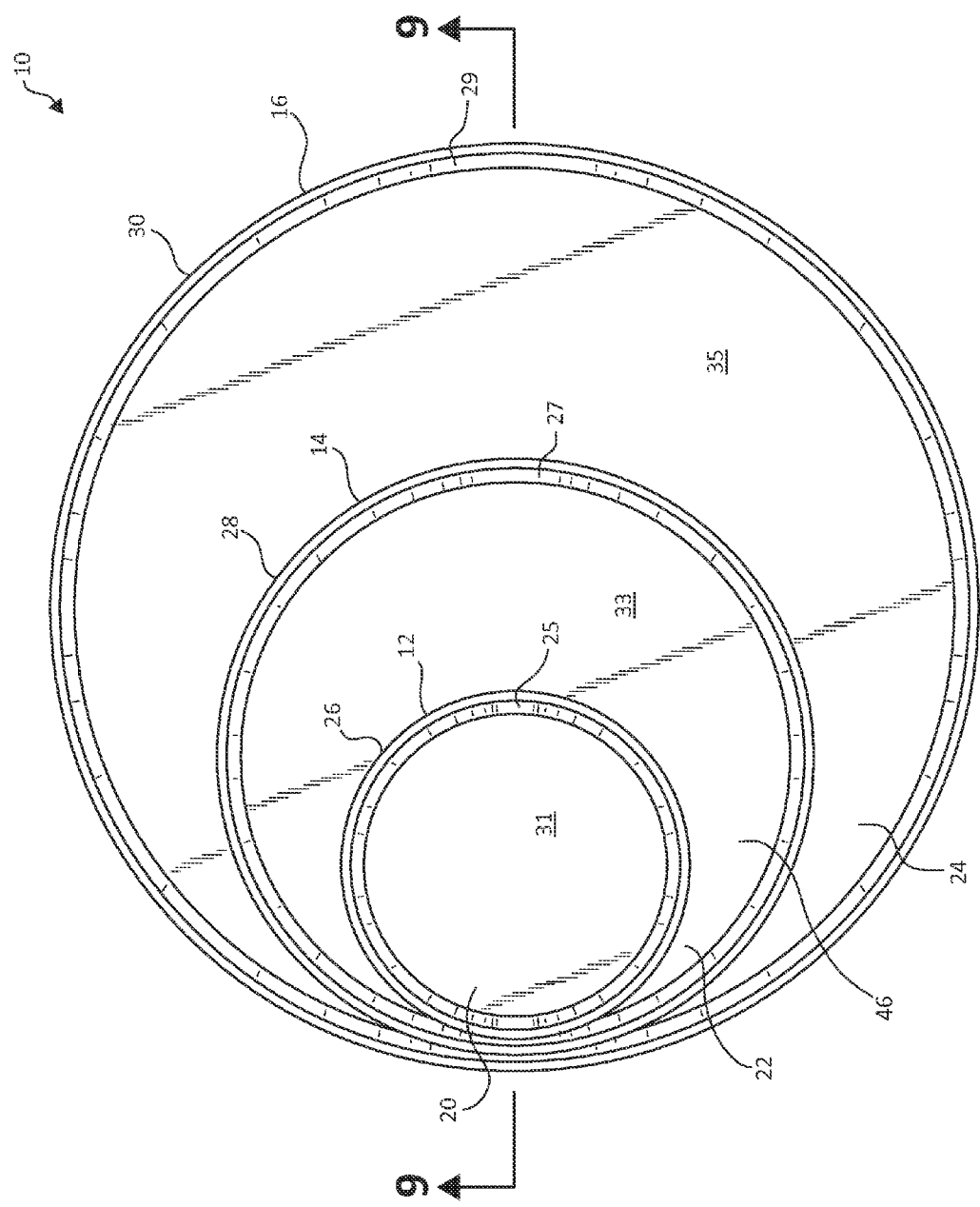
FIG. 4 is a top view illustration of the series of trays of FIG. 1, according to one embodiment of the present invention.
Figure 5:
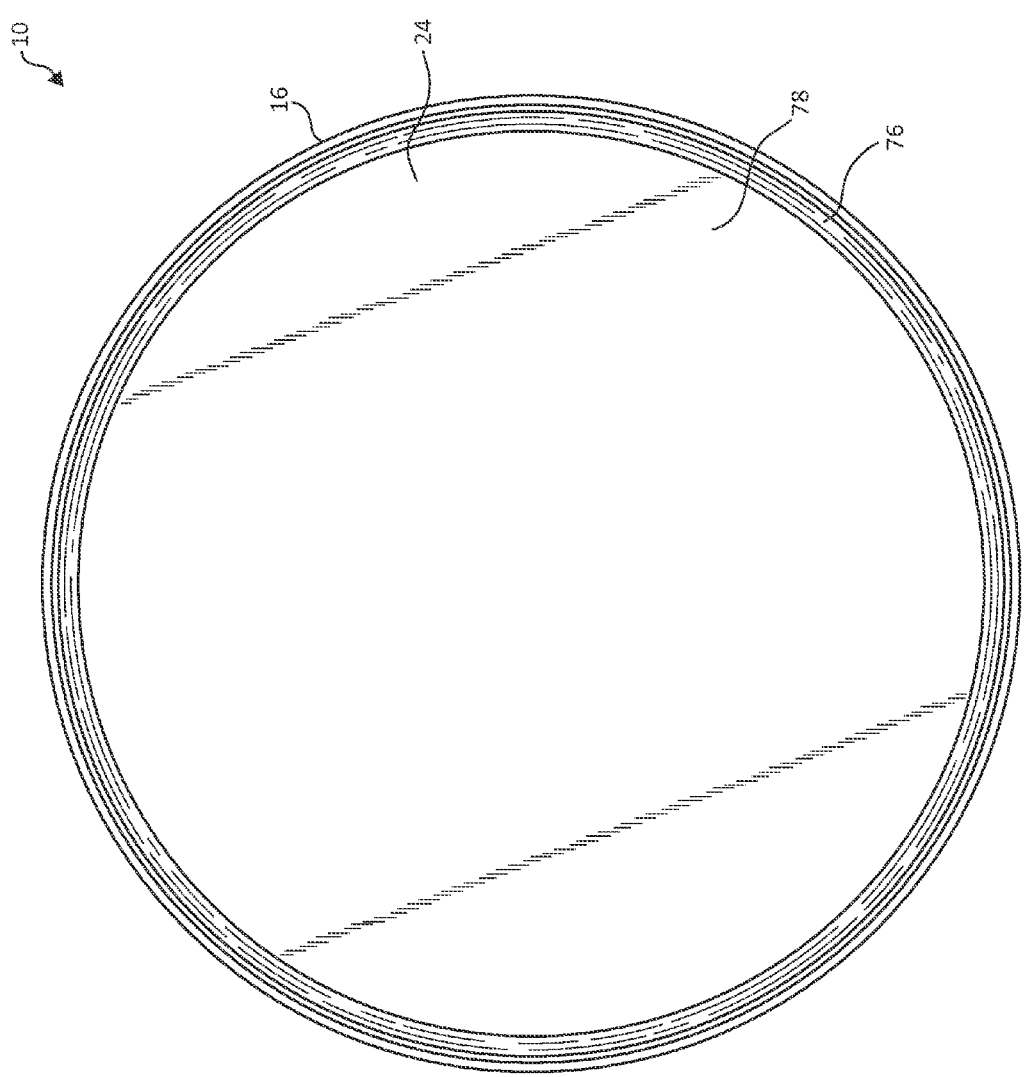
FIG. 5 is a bottom view illustration of the series of trays of FIG. 1, according to one embodiment of the present invention.
Figure 6:
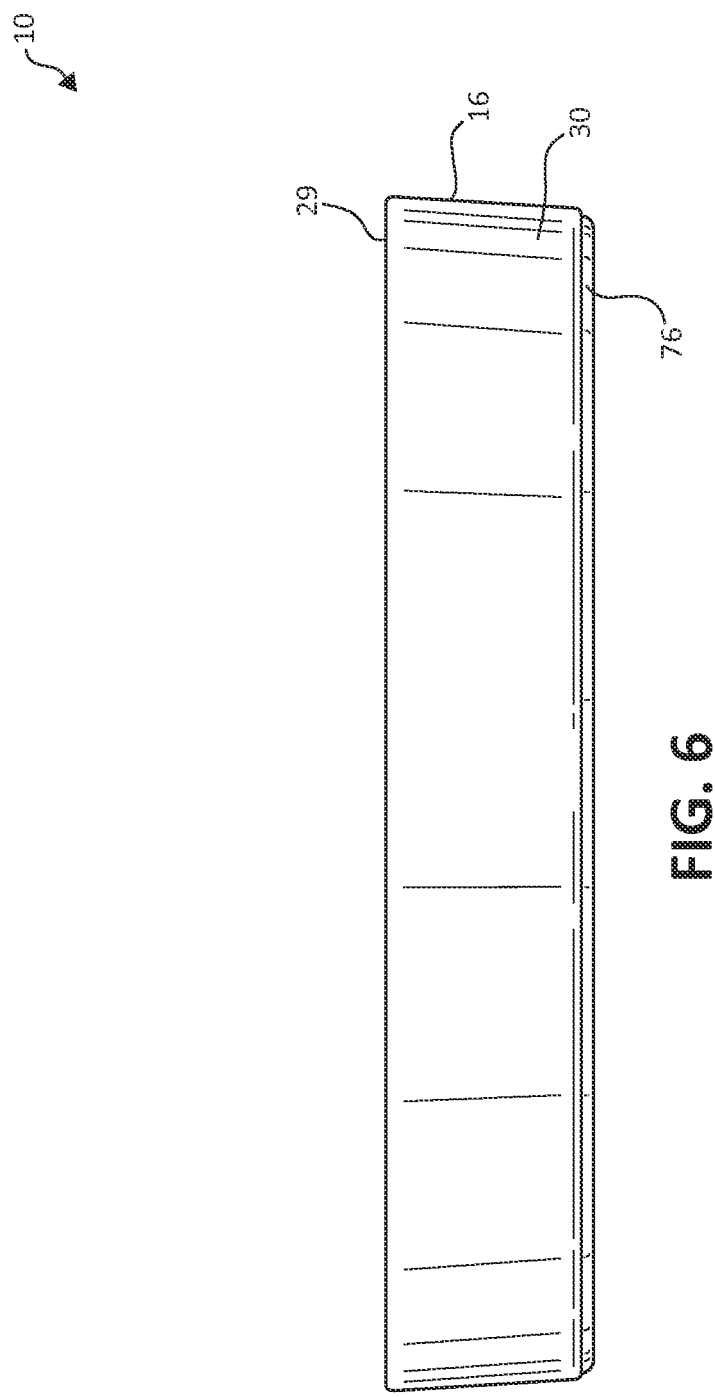
FIG. 6 is a right side view illustration of the series of trays of FIG. 1, with the left side view being a mirror image of the right side view, according to one embodiment of the present invention.
Figure 7:
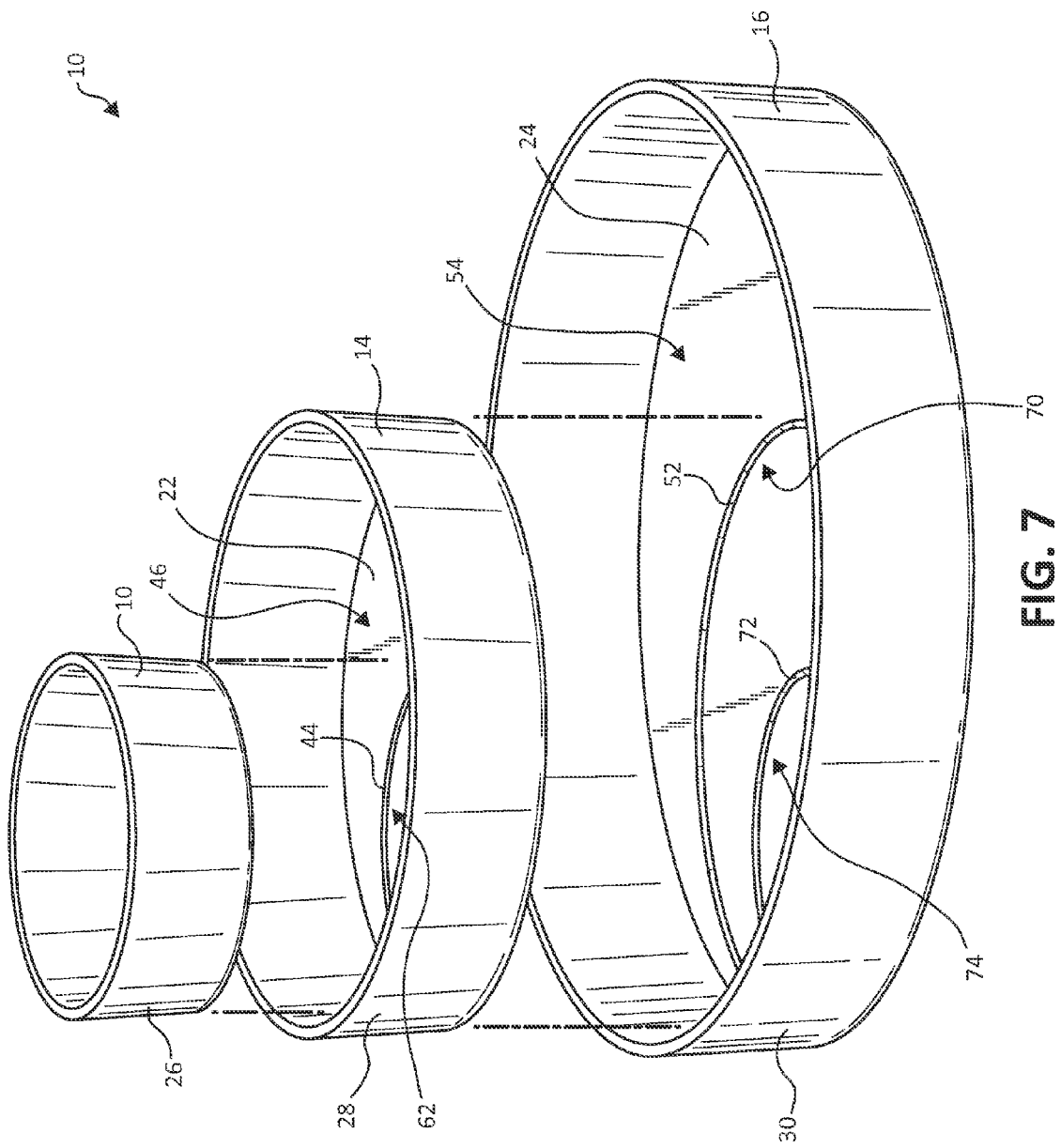
FIG. 7 is front, top perspective view of the series of trays of FIG. 1 in an exploded configuration, according to one embodiment of the present invention.

With reference now to FIGS. 1-10, a series of trays 10 is illustrated. Series of trays 10 includes three trays 12, 14, and 16, which are substantially identical in shape except that each is differently sized from the others. In one example, trays 12, 14, and 16 are sized such that tray 12 is about two-thirds of the size of tray 14, and tray 14 is about two-thirds of the size of tray 16. In other embodiments, relative sizes of trays 12, 14, and 16 are greater or less than two-thirds of the sizes of each other. In any case, small tray 12 is configured to nest within medium tray 14, and medium tray 14 is configured to nest within large tray 16. Although three trays 12, 14, and 16 of substantially identical shape are shown in series 10, more trays and/or trays of differing shapes may be included in series 10. Additionally, although each component of series 10 is referred to as a "tray," the components are contemplated to include bowls, dishes, containers, and any other receptacle or vessel primarily used for holding foods and/or liquids.

Each of trays 12, 14, and 16 has a corresponding bottom or bottom wall 20, 22, or 24 and a corresponding sidewall 26, 28, or 30. Each of sidewalls 26, 28, and 30 extends substantially upwardly from corresponding bottom 20, 22, or 24 along and substantially surrounding a corresponding outer perimeter 32, 34, or 36 thereof. Bottoms 20, 22, and 24 are each substantially planar and have substantially identical outer perimeter shapes in one embodiment. For example, bottoms 20, 22, and 24 are circular disks, one having an increasingly larger dimension than an immediately smaller bottom 20 or 22. Alternatively, one or more of bottoms 20, 22, and/or 24 is not planar and/or circular in shape. For example, one or more of bottoms 20, 22, and/or 24 is concave, convex, or otherwise curved or includes bumps, ridges, or other features on its surface and/or is rectangular, square, or otherwise polygonal in shape. In an example not shown, each of bottoms 20, 22, and 24 has a different shape.

Each of sidewalls 26, 28, and 30 extends around the outer perimeter of corresponding bottom 20, 22, or 24 to form a corresponding cavity 31, 33, or 35, respectively, for receiving items, such as foods, dips, sauces, and the like. Heights of sidewalls 26, 28, and/or 30 may be selected to provide a suitable cavity size appropriate for accommodating the aforementioned items. In one embodiment, each of sidewalls 26, 28, and 30 extends at an upward angle relative to corresponding bottom 20, 22, or 24 to define a closed polygon shape corresponding to the outer perimeter shape of corresponding bottom 20, 22, or 24. For a uniform appearance, sidewalls 26, 28, and 30 each extend from corresponding bottoms 20, 22, or 24 at substantially identical angles. For example, sidewalls 26, 28, and 30 are each substantially perpendicular to corresponding bottoms 20, 22, or 24. In other embodiments, sidewalls 26, 28, and 30 extend at substantially identical non-perpendicular angles relative to corresponding bottoms 20, 22, and 24.

As illustrated, each of sidewalls 26, 28, and 30 extends substantially linearly from corresponding bottoms 20, 22, or 24 and include corresponding top edges 25, 27, and 29. Top edges 25, 27, and 29 are even with, that is extend coplanarly with, each other when trays 12, 14, and 16 are nested together in a three-tray configuration, and thus, in one example, sidewall 26 is shorter than sidewall 28 to accommodate a thickness of bottom 20 when tray 12 is placed in tray 14, and sidewall 28 is shorter than sidewall 30 to accommodate a thickness of bottom 22 when tray 14 is placed in tray 16. Although not shown, one or more of sidewalls 26, 28, or 30 curves inwardly (e.g., in a convex manner) or outwardly (e.g., in a concave manner) relative to corresponding cavity 32, 34, or 36 in another embodiment. As another alternative embodiment, one or more top edges 25, 27, and/or 29 is uneven with another top edge 25, 27, or 29 (as illustrated in FIGS. 13-16).

To allow trays 12, 14, and 16 to nest with each other, an area defined by an outermost dimension of one of trays 14 or 16 is larger than an area defined by the outermost dimension of an immediately smaller tray 12 or 14. For example, in one embodiment, in which sidewalls 26, 28, and 30 slope outwardly from respective bottoms 20, 22, and 24, the outermost dimensions are defined by top edges 25, 27, or 29, respectively. Hence, the area defined by top edge 25 of small tray 12 is smaller than the area defined by top edge 27 of medium tray 14, and the area defined by top edge 27 of medium tray 14 is smaller than the area defined by top edge 29 of large tray 16. In an embodiment in which sidewalls 26, 28, and 30 define the outermost dimensions of respective trays 12, 14, and 16, the area defined by sidewall 26 is smaller than the area defined by sidewall 28, and the area defined by sidewall 28 is smaller than the area defined by sidewall 30. In this way, an entirety of tray 12 can be disposed within tray 14, and an entirety of tray 14 can be disposed within tray 16.

Trays 12, 14, and 16 are configured such that two or more can be secured with each other for easy storage, transportation, and/or use. In this regard, trays 12, 14, and 16 include corresponding features that mate together to form a pair for temporary coupling. Each of these mechanisms will now be described in detail below.

Turning to FIGS. 8-10, small tray 12 includes a coupling feature 42 formed on an exterior face 40 of its bottom 20. More particularly, coupling feature 42 is formed along an outer perimeter of bottom 20 at or just inside an outermost edge 56 of bottom 20. In an embodiment, coupling feature 42 is defined by providing a curved surface, ridge, and/or flange extending between an inner diameter 58 and an outer diameter 60 downwardly from bottom 20. Coupling feature 42 is substantially circular or otherwise shaped substantially identically to bottom 20 and forms a continuous closed loop around bottom 20. According to an embodiment, coupling feature 42 is configured to provide stability when small tray 12 is placed on a horizontal support surface and thus has a bottommost surface configured to provide continuous contact with the horizontal support surface or having three or more bottommost points capable of sitting on a single plane.

Medium tray 14 includes a coupling feature 44 configured to form a mated pair with coupling feature 42. Coupling feature 44 is formed on an interior face 46 of bottom 22 of medium tray 14, and, in an embodiment protrudes upwardly therefrom to define an annular rim, ridge, etc. The location of coupling feature 44 on interior face 46 of bottom 22 depends on a desired location of small tray 12 relative to medium tray 14. In an embodiment in which series 10 is configured such that small tray 12 is to be placed off center relative to medium tray 14, coupling feature 44, likewise, is positioned off center relative to bottom 22. As illustrated in FIGS. 7-10, an initiation point on the annulus defining coupling feature 44 is located just inside of an edge of interior face 46 of bottom 22, and coupling feature 44 continues to a point on the annulus opposite the initiation point beyond a center of bottom 22. In another embodiment, not illustrated, small tray 12 is concentrically positioned relative to medium tray 14, and second portion 44 is concentrically positioned relative to bottom 22.

Regardless of location, to correspond with coupling feature 42, coupling feature 44 has at least an inner diameter 62 that is substantially identical or slightly larger than outer diameter 60 of coupling feature 42. Thus, when small tray 12 is placed over medium tray 14 such that coupling feature 44 aligns with coupling feature 42, coupling feature 44 of small tray 12 fits within and is substantially restricted from transverse movement (e.g., lateral and longitudinal movement) by coupling feature 42.

Medium tray 14 further includes a coupling feature 50 formed on an exterior face 48 of its bottom 22. Coupling feature 50 is formed along an outer perimeter of bottom 22 at or just inside an outermost edge 64 of bottom 22. In an embodiment, coupling feature 50 is defined by a circular or otherwise suitably shaped flange or a curved surface protruding downwardly from bottom 22 and extending between an inner diameter 66 and an outer diameter 68. Coupling feature 50 forms a continuous closed loop around bottom 20 and has a bottommost surface configured to provide continuous contact with the horizontal support surface or has three or more bottommost points capable of sitting on a single plane.

Large tray 16 includes a coupling feature 52, which is configured to correspond with coupling feature 50 to form a mated pair of features. Coupling feature 52 is formed on interior face 54 of bottom 24 of large tray 16. The location of coupling feature 52, similar to the location of coupling feature 44 described above, depends on the particulars of series 10, and in particular, a desired placement of middle tray 14 relative to large tray 16. For example, series 10 is configured such that middle tray 14 is off center relative to large tray 16 such that a single portion of sidewall 28 of medium tray 14 can be placed closer to one portion of sidewall 30 of large tray 16 than all other portions. Hence, the circle forming coupling feature 52 has an initiation point at a location on interior face 54 of bottom 24 that is just inside of an edge of bottom 24, and a point on the circle forming coupling feature 52 opposite the initiation point is located beyond a center of bottom 24. In another embodiment (not shown), medium tray 14 is configured to be placed concentrically relative to large tray 16 and hence, coupling feature 52 is formed concentric to bottom 24.

In an embodiment, coupling feature 52 protrudes upwardly from interior face 54 forming a ridge or rim. To temporarily couple with coupling feature 50, coupling feature 52 has an inner diameter 70 that is substantially equal to or slightly larger than outer diameter 68 of coupling feature 50. When coupling features 50 and 52 are aligned and fit together, the position of middle tray 14 relative to large tray 16 is maintained in at least two directions (e.g., laterally and longitudinally, but perhaps not vertically).

Large tray 16 includes an additional coupling feature 72 formed on interior face 54 of its bottom 24 for coupling with coupling feature 42 of small tray 12, in another embodiment. In particular, coupling feature 72 corresponds with coupling feature 42 to form a mated pair to directly couple large tray 16 and small tray 12. Depending on a desired placement of small tray 12 within large tray 16, coupling feature 72 is formed at any desired location on interior face 54 of bottom 24 of large tray 16. In one example, series 10 is configured such that small tray 12 is to be positioned non-concentrically to large tray 16 without regard to placement of middle tray 14 in series 10. In such case, coupling feature 72 is formed off center relative to bottom 24. In another example, the positioning of small tray 12 relative to large tray 16 is configured to be substantially identical to placement of small tray 12 in middle tray 14, when middle tray 14 is disposed in large tray 16. Hence, coupling feature 72 is formed inside of coupling feature 52 along corresponding locations of interior face 54. As a result, a gap 73 is formed between sidewall 26 of small tray 12 and sidewall 30 of large tray 16 having a width larger than a width of sidewall 28 of medium tray 14 when the trays 12 and 16 are directly coupled together as illustrated in FIG. 10. In another example (not shown), coupling feature 72 overlaps with coupling feature 52 so that when coupling feature 72 is attached to coupling feature 42, sidewall 26 of small tray 12 and sidewall 30 of large tray 16 are immediately adjacent each other. In still another example, coupling feature 72 is concentrically positioned with respect to coupling feature 52.

Coupling feature 72 protrudes upwardly from interior face 54 forming a ridge or a rim and has an inner diameter 74 that is substantially equal to or slightly larger than outer diameter 60 of coupling feature 42. Accordingly, when small tray 12 is placed in large tray 16 and coupling feature 42 is aligned with coupling feature 72, movement of small tray 12 relatively to large tray 16 is substantially restricted in lateral and longitudinal directions. In any case, by including coupling features 42 and 50 on small and medium trays 12 and 14, respectively, that fit with corresponding coupling features 44, 52, and 72, trays 12 and 14 are constrained from movement in at least two perpendicular directions (for example, lateral and longitudinal directions) when situated within corresponding trays 14 and 16. In particular, small tray 12 can fit with to medium tray 14 to form a two-tray set, medium tray 14 can fit with large tray 16 to form a two-tray set, or all three trays 12, 14, and 16 can fit together (e.g., medium tray 14 in large tray 16 and small tray 12 in medium tray 14) to form a three tray set. Furthermore, small tray 12 can be removed from medium tray 14 and the inclusion of coupling feature 72 allows small tray 12 to fit directly within large tray 14 in a fourth set configuration. In still alternate embodiments, trays 12, 14, and/or 16 are used individually.

It will be appreciated that although coupling features 42 and 50, and hence corresponding coupling features 44, 52, and 72, are shown as being substantially circular and coupling features 42 and 50 are positioned inwardly from outer edges of corresponding bottoms 20 and 22, other configurations are contemplated. In an embodiment, coupling features 42 and/or 50 are formed along portions of small and medium trays 12 and 14, respectively, other than inside outer perimeter edges thereof. For instance, one or both of coupling features 42 and/or 50 extends along outer edges of corresponding bottoms 20 and 22, in an embodiment. Alternatively, one or both of coupling features 42 and/or 50 extend outside of outer edges of corresponding bottoms 20 and 22. In another example, coupling features 42 and/or 50 are formed inwardly from outer edges of corresponding bottoms 20 and 22 providing a substantially space between the outer edges and coupling features 42 and/or 50.

In another configuration, coupling features 42 and/or 50 are non-circular, such as oval, triangular, rectangular, pentagonal, five-pointed star shaped, or another closed polygonal shape. According to another embodiment, coupling features 42 and/or 50 do not correspond with the shapes of the outer perimeters of bottoms 20 and 22 but do correspond with those of coupling features 44, 52, and/or 72. Thus, bottoms 20, 22, and 24 may be circular, while coupling features 42 and/or 50 and coupling features 44, 52, and/or 72 are another shape.

Although coupling features 42 and 50 and coupling features 44, 52, and/or 72 are illustrated as being defined by continuous surfaces defining completely closed shapes, each of coupling features 42, 50, 44, 52, and/or 72 alternatively is defined by staggered blocks or sections that outline or define a portion of a closed shape. For example, coupling features 42 and/or 50 include three or more equally spaced blocks or sections generally forming a circle, an oval, tips of a star shape, or another shape, and coupling features 44, 52, and/or 72 are substantially similarly shaped and dimensioned to corresponding to the staggered sections of coupling features 42 and/or 50.

In another embodiment, the particular coupling mechanisms of coupling features 42 and 50 and 44, 52, and 72 are not limited to the flanges and rims as described above. In one example, the inner diameter of coupling feature 42 is substantially equal or slightly larger than the outer diameter of coupling feature 44 and/or coupling feature 72, and the inner diameter of coupling feature 50 is substantially equal to or slightly larger than the outer diameter of coupling feature 52, as illustrated in FIGS. 11 and 12.

In another example illustrated in FIGS. 13 and 14, coupling features 142 and 150 are defined by flanges similar to those described above and formed in bottoms 120 and 122, respectively, while coupling features 144, 152, and/or 172 are grooves. Each of grooves 144, 152, and/or 172 is formed as an indentation in interior faces 146 and 154 of bottoms 122 and 124, respectively. Grooves 144 and 172 are shaped to receive at least a portion of coupling feature 142 to allow feature 142 to rest in either groove 144 or 172 when small tray 112 and medium or large tray 114 or 116 are used together. Groove 152 is shaped to receive at least a portion of coupling feature 150 when medium tray 114 and is with large tray 116. In an embodiment, one or more of grooves 144, 152, and/or 172 is substantially equal in dimensions to complement corresponding coupling feature 142 or 150. In another embodiment, one or more of grooves 144, 152, and/or 172 is shallower than corresponding coupling feature 142 or 150 to receive only a portion thereof. In another embodiment as illustrated in FIGS. 15 and 16, one or both of coupling feature 242 and/or 250 are formed as grooves, while corresponding coupling features 244, 252, and/or 272 are formed as flanges. In still other embodiments, coupling features 42, 50, 142, 150, 242, and/or 250 and corresponding coupling features 44, 52, 72, 144, 152, 172, 244, 252, and/or 272 temporarily secure together via other coupling mechanisms, such as a twist and lock mechanism or another mechanism.

As noted briefly above, series of trays 10 can include more than three trays. In an embodiment, large tray 16 includes a flange 76 extending downwardly from an exterior surface 78 of bottom 24 for coupling with a coupling feature formed on another larger tray (not illustrated). Flange 76 is formed just inside and is substantially similarly shaped to an outer perimeter of bottom 24. In embodiments in which large tray 16 is not temporarily attachable to a larger tray, flange 76 is included to provide stability when tray 16 is placed on a horizontal surface. Hence, although flange 76 is shown as a continuous circular flange, alternate embodiments of flange 76 include three or more spaced apart protuberances or the like.

Although the invention has been described with respect to particular embodiments, such embodiments are meant for the purposes of illustrating examples only and should not be considered to limit the invention or the application and uses of the invention. Various alternatives, modifications, and changes will be apparent to those of ordinary skill in the art upon reading this application. Furthermore, there is no intention to be bound by any theory presented in the preceding background of the invention or the above detailed description.

What is claimed is:

1. A series of vessels comprising:
   a first vessel including:
     a first bottom wall, and
     a first coupling feature formed on a bottom surface of the first bottom wall;
   a second vessel sized larger than the first vessel and including:
     a second bottom wall,
     a second coupling feature formed on a top surface of the second bottom wall and configured to engage with the first coupling feature of the first vessel to form a first mated pair selectively mating the first vessel with the second vessel, and
     a third coupling feature formed on a bottom surface of the second bottom wall; and
   a third vessel sized larger than the second vessel and including:
     a third bottom wall,
     a fourth coupling feature formed on a top surface of the third bottom wall and configured to engage with the third coupling feature of the second vessel to form a second mated pair selectively mating the second vessel with the third vessel, and
     a fifth coupling feature formed on the top surface of the third bottom wall and configured to selectively engage with the first coupling feature of the first vessel to form a third mated pair selectively mating the first vessel with the third vessel, wherein the series of vessels only forms one of the second mated pair and the third mated pair at any one time;
   wherein:
     the first coupling feature and the third coupling feature are each defined by a flange extending downwardly from the first bottom wall and the second bottom wall, respectively,
     the second coupling feature is defined by a rim extending upwardly from the second bottom wall, and
     the fourth coupling feature and the fifth coupling feature are each defined by a rim extending upwardly from the third bottom wall.

2. The series of vessels of claim 1, wherein:
   the first coupling feature has an outer diameter that is substantially equal to or is smaller than an inner diameter of the second coupling feature to substantially constrain lateral and longitudinal movement of the first vessel relative to the second vessel when the first mated pair is formed;
   the fifth coupling feature defines an inner diameter substantially equal to the inner diameter of the second coupling feature to constrain lateral and longitudinal movement of the first vessel relative to the third vessel when the third mated pair is formed; and
   the third coupling feature has an outer diameter that is substantially equal to or is smaller than an inner diameter of the fourth coupling feature to substantially constrain lateral and longitudinal movement of the second vessel relative to the third vessel when the second mated pair is formed.

3. The series of vessels of claim 1, wherein:
   the first vessel is positioned in a non-concentric manner relative to the second vessel when the first mated pair is formed, and the second vessel is positioned in a non-concentric manner relative to the third vessel when the second mated pair is formed.

4. The series of vessels of claim 1, wherein each of the first coupling feature, the second coupling feature, the third coupling feature, the fourth coupling feature, and the fifth coupling feature are annular in shape.

5. The series of vessels of claim 1, wherein the fifth coupling feature is formed entirely inside a footprint of the fourth coupling feature.

6. The series of vessels of claim 1, wherein:
each of the first coupling feature, the second coupling feature, the third coupling feature, the fourth coupling feature, and the fifth coupling feature are substantially identical closed shapes of differing sizes;
the fifth coupling feature is formed inside the fourth coupling feature; and
the fifth coupling feature defines a first point positioned immediately adjacent to the fourth coupling feature and a second point positioned opposite the first point and spaced a largest spacing distance away from the fourth coupling feature.

7. The series of vessels of claim 1, wherein the first vessel is about two-thirds the size of the second vessel, and the second vessel is about two-thirds the size of the third vessel.

8. The series of vessels of claim 1, each of the first vessel, the second vessel, and the third vessel has a top edge, and the top edges of each of the first vessel, the second vessel, and the third vessel are positioned to be substantially coplanar when the second vessel is selectively mated with the first vessel and the third vessel.

9. The series of vessels of claim 1, wherein:
the first vessel is placed within the second vessel and mated to the second vessel via the first mated pair such that movement of the first vessel relative to the second vessel is substantially prevented in at least two directions that are substantially perpendicular to one another,
the second vessel is placed within the third vessel and is mated to the third vessel via the second mated pair such that movement of the second vessel relative to the third vessel is substantially prevented in at least two directions that are substantially perpendicular to one another,
each of the first vessel, the second vessel, and the third vessel has a topmost edge, and
the topmost edges of each of the first vessel, the second vessel, and the third vessel are positioned to be substantially coplanar with one another.

10. A series of vessels comprising:
a first vessel including:
a first bottom wall, and
a first coupling feature formed on a bottom surface of the first bottom wall;
a second vessel sized larger than the first vessel and including:
a second bottom wall,
a second coupling feature formed on a top surface of the second bottom wall and configured to engage with the first coupling feature of the first vessel to form a first mated pair selectively mating the first vessel with the second vessel, and
a third coupling feature formed on a bottom surface of the second bottom wall; and
a third vessel sized larger than the second vessel and including:
a third bottom wall,
a fourth coupling feature formed on a top surface of the third bottom wall and configured to engage with the third coupling feature of the second vessel to form a second mated pair selectively mating the second vessel with the third vessel, and
a fifth coupling feature formed on the to surface of the third bottom wall and configured to selectively engage with the first coupling feature of the first vessel to form a third mated pair selectively mating the first vessel with the third vessel, wherein the series of vessels only forms one of the second mated pair and the third mated pair at any one time;
wherein:
the first coupling feature and the third coupling feature are defined by downwardly extending flanges, and
the second coupling feature, the fourth coupling feature, and the fifth coupling feature are defined by grooves each configured to receive at least a portion of a corresponding one of the downwardly extending flanges.

11. A series of vessels comprising:
a first vessel including:
a first bottom wall, and
a first coupling feature formed on a bottom surface of the first bottom wall;
a second vessel sized larger than the first vessel and including:
a second bottom wall,
a second coupling feature formed on a top surface of the second bottom wall and configured to engage with the first coupling feature of the first vessel to form a first mated pair selectively mating the first vessel with the second vessel, and
a third coupling feature formed on a bottom surface of the second bottom wall; and
a third vessel sized larger than the second vessel and including:
a third bottom wall,
a fourth coupling feature formed on a top surface of the third bottom wall and configured to engage with the third coupling feature of the second vessel to form a second mated pair selectively mating the second vessel with the third vessel, and
a fifth coupling feature formed on the to surface of the third bottom wall and configured to selectively engage with the first coupling feature of the first vessel to form a third mated pair selectively mating the first vessel with the third vessel, wherein the series of vessels only forms one of the second mated pair and the third mated pair at any one time;
wherein:
the second coupling feature, the fourth coupling feature, and the fifth coupling feature are defined by upwardly extending flanges, and
the first coupling feature and the third coupling feature are defined by grooves configured to receive at least a portion of a corresponding one of the upwardly extending flanges.

12. A nesting tray set comprising:
a small tray including a first bottom and a first flange extending downwardly from the first bottom;
a medium tray including a second bottom, a second flange extending downwardly from the second bottom, and a first rim protruding upwardly from the second bottom, wherein the firm rim is shaped substantially identical to and one of slightly smaller and slightly larger than the first flange of the small tray; and
a large tray including a third bottom, a second rim, and a third rim, wherein each of the second rim and the third rim protrude upwardly from the third bottom, the second rim is smaller than the third rim and is shaped substantially identical to and one of slightly smaller and slightly larger than the first flange of the small tray, and the third rim is shaped substantially identical to and one of slightly smaller and slightly larger than the second flange of the medium tray;

wherein the nesting tray set is configured to be provided in a plurality of different configurations including:

a first two-tray set configuration in which the first flange and the first rim are aligned to nest the small tray with the medium tray such that a lateral position and a longitudinal position of the small tray relative to the medium tray is maintained, a second two-tray set configuration in which the first flange and the second rim are aligned to nest the small tray with the large tray such that a lateral position and a longitudinal position of the small tray relative to the large tray is maintained, a third two-tray set configuration in which the second flange and the third rim are aligned to nest the medium tray with the large tray such that a lateral position and a longitudinal position of the medium tray relative to the large tray is maintained, and a three-tray set configuration in which the small tray is added to the third two-tray set configuration in a manner aligning the first flange and the first rim with each other to nest the small tray with the medium tray such that a lateral position and a longitudinal position of the small tray relative to the medium tray is maintained.

13. The nesting tray set of claim 12, wherein:
an outer diameter of the first flange is substantially equal to or slightly smaller than an inner diameter of the first rim;
the outer diameter of the first flange is substantially equal to or slightly smaller than an inner diameter of the second rim; and
an outer diameter of the second flange is substantially equal to or slightly smaller than an inner diameter of the third rim.

14. The nesting tray set of claim 12, wherein the first flange, the second flange, the first rim, the second rim, and the third rim are each substantially circular in shape.

15. The nesting tray set of claim 12, wherein:
the second rim is positioned within the third rim and is spaced apart from a side of the large tray to provide a gap between the small tray and the large tray when the nesting tray set is in the second two-tray set configuration, and
the gap is at least as wide as a width of a sidewall of the medium tray.

16. The nesting tray set of claim 12, wherein:
the small tray and the large tray each define a top edge, and
the top edge of the small tray is positioned below the top edge of the large tray when the nesting tray set is in the second two-tray set configuration.

17. The nesting tray set of claim 16, wherein the medium tray defines a top edge that is positioned substantially coplanar with the top edge of the large tray when the nesting tray set is in the third two-tray set configuration and when the nesting tray set is in the three-tray set configuration.

18. The nesting tray set of claim 17, wherein the top edge of the small tray is positioned substantially coplanar with the top edge of the large tray and the top edge of the medium tray when the nesting tray set is in the three-tray set configuration.

19. A method of manufacturing a series of trays for retail sale in a set including:
molding a small tray, the small tray including a first bottom wall, a first sidewall extending upwardly from an outer perimeter of the first bottom wall, and a first coupling feature formed on a bottom surface of the first bottom wall;

molding a medium tray, the medium tray including a second bottom wall, a second sidewall extending upwardly from an outer perimeter of the second bottom wall, a second coupling feature formed on a top surface of the second bottom wall in a position inset from the second sidewall, and a third coupling feature formed on a bottom surface of the second bottom wall;

molding a large tray, the large tray including a third bottom wall, a third sidewall extending upwardly from an outer perimeter of the third bottom wall, a fourth coupling feature formed on a top surface of the third bottom wall inset from the third sidewall, and a fifth coupling feature formed on the top surface of the third bottom wall and surrounded by the fourth coupling feature, wherein the fifth coupling feature of the large tray is substantially identical to the second coupling feature of the medium tray;

placing the small tray within the confines of the second sidewall of the medium tray such that the first coupling feature of the small tray mates with the second coupling feature of the medium tray to confine movement of the small tray relative to the medium tray in at least two transverse directions; and placing the medium tray within the confines of the third sidewall of the large tray such that the third coupling feature of the medium tray mates with the fourth coupling feature of the large tray to confine movement of the medium tray relative to the large tray in at least two transverse directions.

20. The method of claim 19, wherein each of the first coupling feature, the second coupling feature, the third coupling feature, the fourth coupling feature, and the fifth coupling feature are protruding rims extending from a respective one of the first bottom wall, the second bottom wall, and the third bottom wall.

21. The method of claim 19, wherein:
each of the first coupling feature and the third coupling feature is one of a protruding closed rim and a groove, and
each of the second coupling feature, the fourth coupling feature, and the fifth coupling feature is the other one of the protruding closed rim and the groove.

22. The method of claim 19, wherein:
each of the first coupling feature, the second coupling feature, the third coupling feature, the fourth coupling feature, and the fifth coupling feature are formed in a substantially identical shape,
the first coupling feature is one of larger than and smaller than the second coupling feature such that the first coupling feature is concentrically positioned relative to and abuts the second coupling feature, and
the third coupling feature is one of larger than and smaller than the fourth coupling feature such that the third coupling feature is concentrically positioned relative to and abuts the fourth coupling feature.

23. The method of claim 21, wherein:
placing the small tray within the confines of the second sidewall of the medium tray includes placing the first coupling feature within the confines of and positioned concentrically relative to the second coupling feature, and
placing the medium tray within the confines of the third sidewall of the large tray includes placing the third coupling feature within the confines of and positioned concentrically relative to the fourth coupling feature.

24. The method of claim 19, wherein:
each of the first sidewall of the small tray, the second sidewall of the medium tray, and the third sidewall of the large tray defines a topmost edge opposite a respective one of the first bottom wall, the second bottom wall, and the third bottom wall,
placing the small tray within the confines of the second sidewall of the medium tray positions the topmost edge of the small bowl to be coplanarly positioned relative to the topmost edge of the medium bowl; and
placing the medium tray within the confines of the third sidewall of the large tray positions the topmost edge of the medium bowl to be coplanarly positioned relative to the topmost edge of the large bowl.

\* \* \* \* \*